(12) United States Patent
Schuyler

(10) Patent No.: US 7,299,612 B2
(45) Date of Patent: Nov. 27, 2007

(54) ROTARY MOWER BLADE

(76) Inventor: John Schuyler, 109 Wallasey Rd., Wilmington, DE (US) 19808

( * ) Notice: Subject to any disclaimer, the term of this patent is extended or adjusted under 35 U.S.C. 154(b) by 0 days.

(21) Appl. No.: 11/393,408

(22) Filed: Mar. 30, 2006

(65) Prior Publication Data
US 2007/0227113 A1 Oct. 4, 2007

(51) Int. Cl.
*A01D 34/52* (2006.01)
(52) U.S. Cl. ............... 56/255; 56/295; 56/DIG. 17
(58) Field of Classification Search .......... 56/DIG. 17, 56/295, 294, 13.7, 17.5, 121.43, 238, DIG. 19, 56/DIG. 20, 255; D15/17; D8/20
See application file for complete search history.

(56) References Cited

U.S. PATENT DOCUMENTS

| 2,869,311 | A |   | 1/1959  | Beeston   |        |
|-----------|---|---|---------|-----------|--------|
| 3,022,621 | A | * | 2/1962  | Zavarella | 56/295 |
| 3,214,896 | A |   | 11/1965 | Watkins   |        |
| 3,452,524 | A |   | 7/1969  | Guetterman|        |
| 3,949,541 | A |   | 4/1976  | Henry     |        |
| 3,998,037 | A | * | 12/1976 | Deans et al. | 56/295 |
| 4,617,788 | A |   | 10/1986 | Sebastian |        |
| 5,452,569 | A | * | 9/1995  | Anderson  | 56/295 |
| 5,581,987 | A |   | 12/1996 | Schuyler  |        |
| 5,839,263 | A | * | 11/1998 | Biernath et al. | 56/255 |
| 5,899,053 | A |   | 5/1999  | Roth      |        |
| 6,487,840 | B1|   | 12/2002 | Turner    |        |
| 6,675,569 | B2| * | 1/2004  | Mannon et al. | 56/295 |
| 2005/0172601 | A1| * | 8/2005 | Besogne | 56/295 |

OTHER PUBLICATIONS

*Science News*, Sep. 4, 2004, pp. 154-156.

* cited by examiner

*Primary Examiner*—Thomas B. Will
*Assistant Examiner*—Mai T Nguyen
(74) *Attorney, Agent, or Firm*—Connolly Bove Lodge & Hutz, LLP

(57) ABSTRACT

A rotary motor blade has rotational mounting structure in its body member to mount the blade to a power driven motor and thereby rotate the blade. The body member includes at least one free end extending outwardly of the mounting structure with the free end having a front leading edge and a rear trailing edge interconnected by a tip. At least a portion of the front leading edge is tapered to comprise a cutting edge. At least one and preferably a plurality of air flow deforming elements such as indentations are formed in the front leading edge and extend inwardly from the exposed outer surface of the front leading edge to disturb air flow along the rotating blade and enhance the creation of vortices which allow the flow to go from the front leading edge to the rear trailing edge.

20 Claims, 4 Drawing Sheets

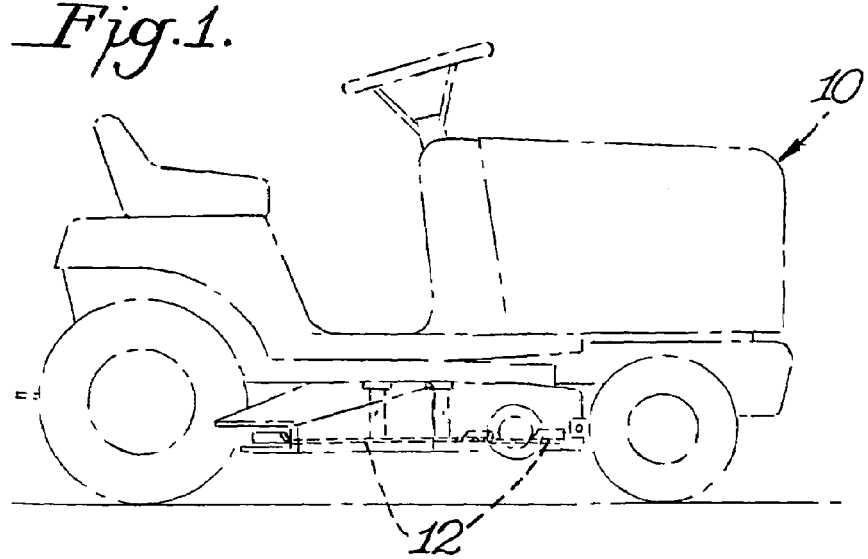
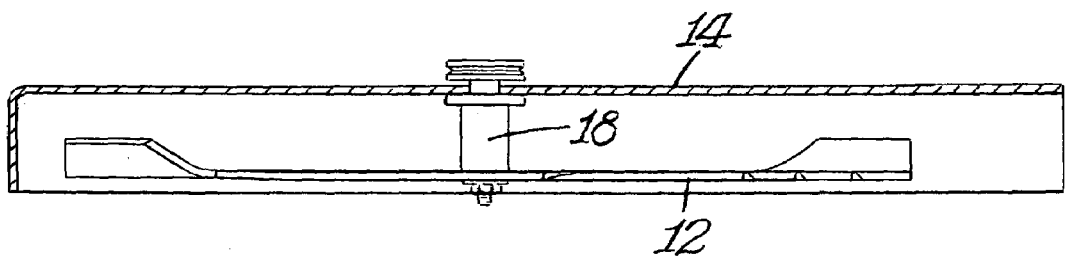
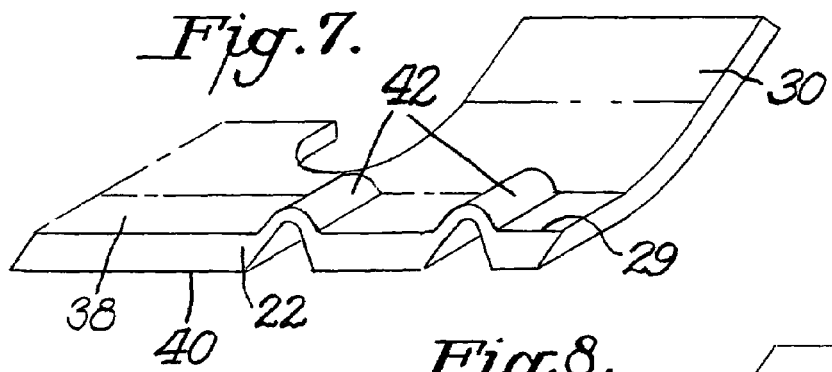
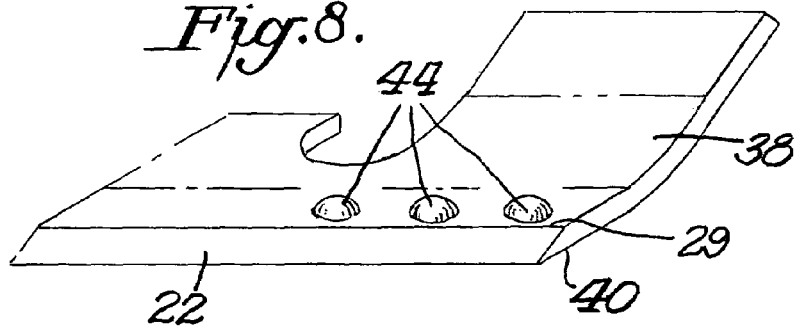

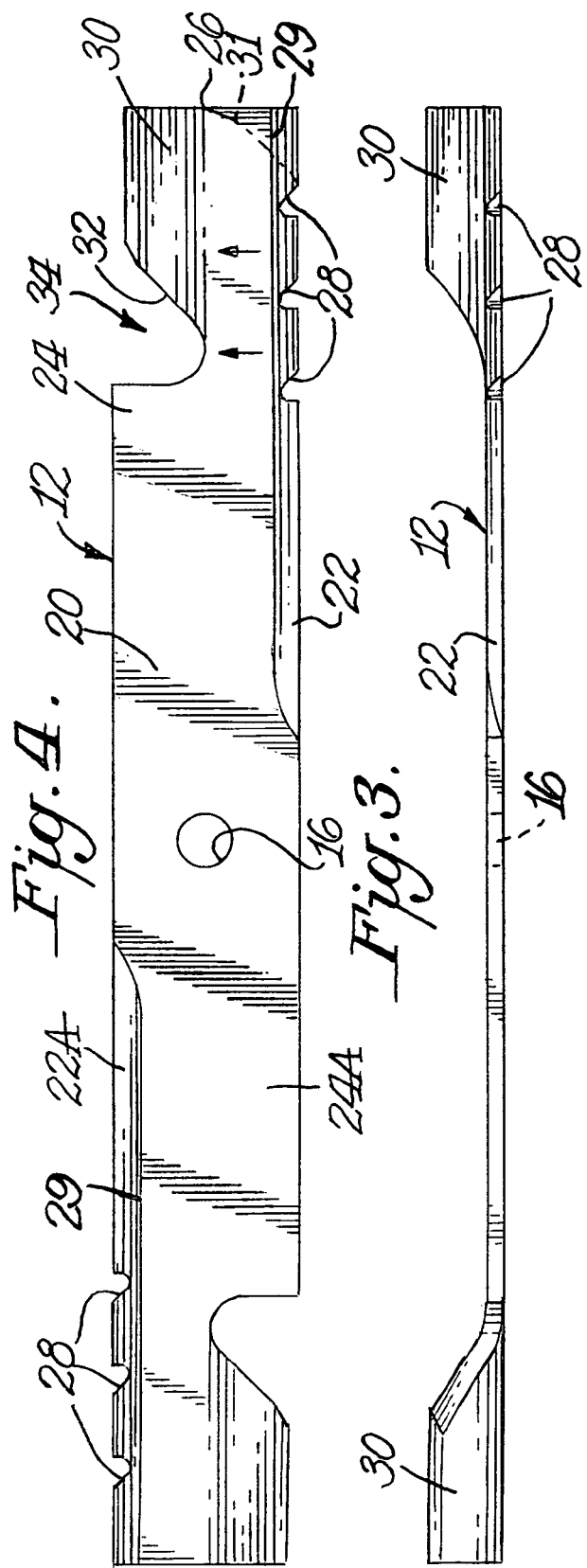
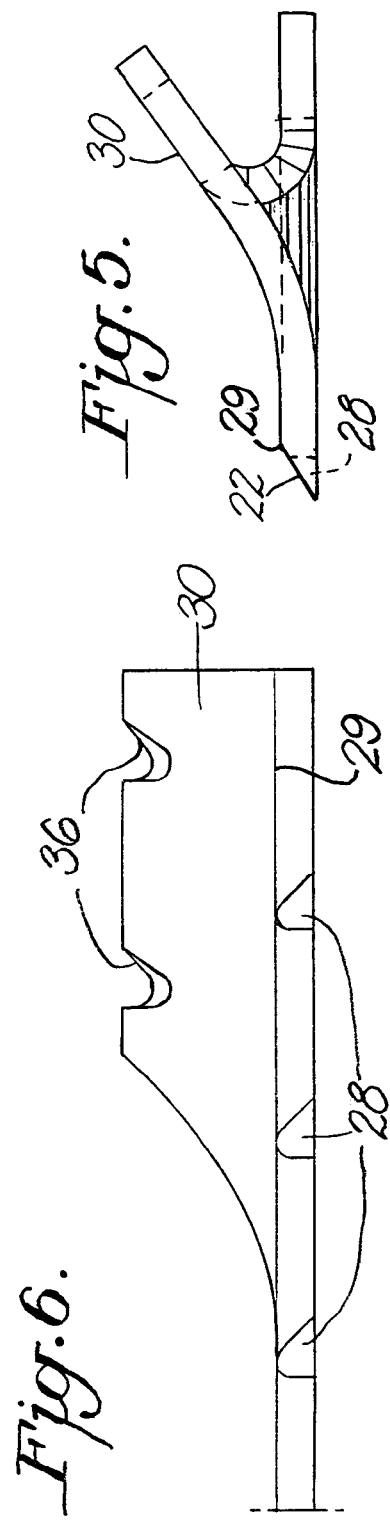

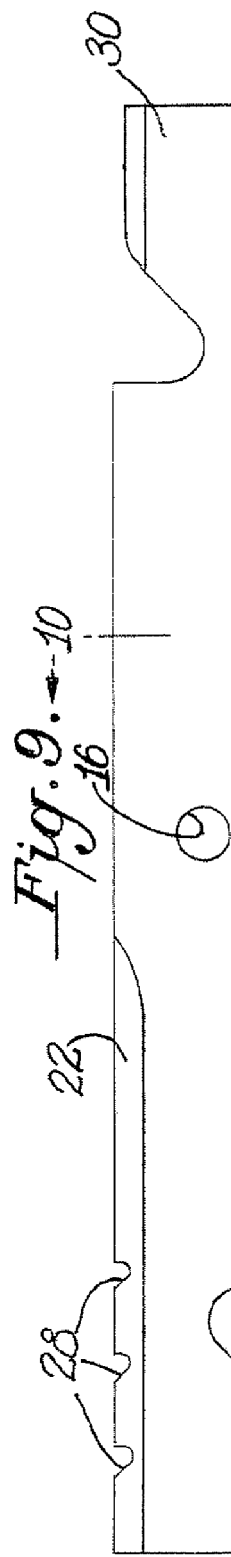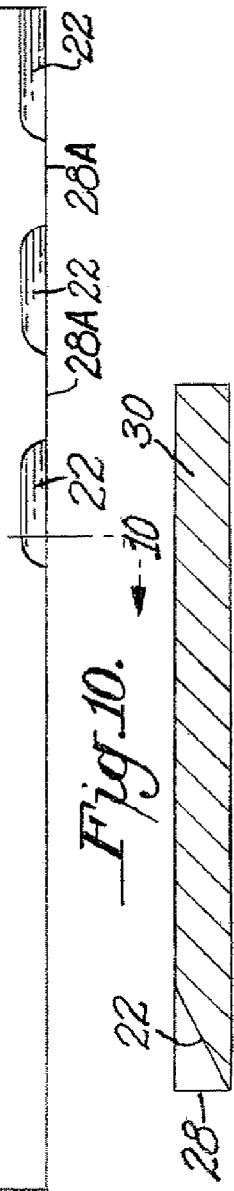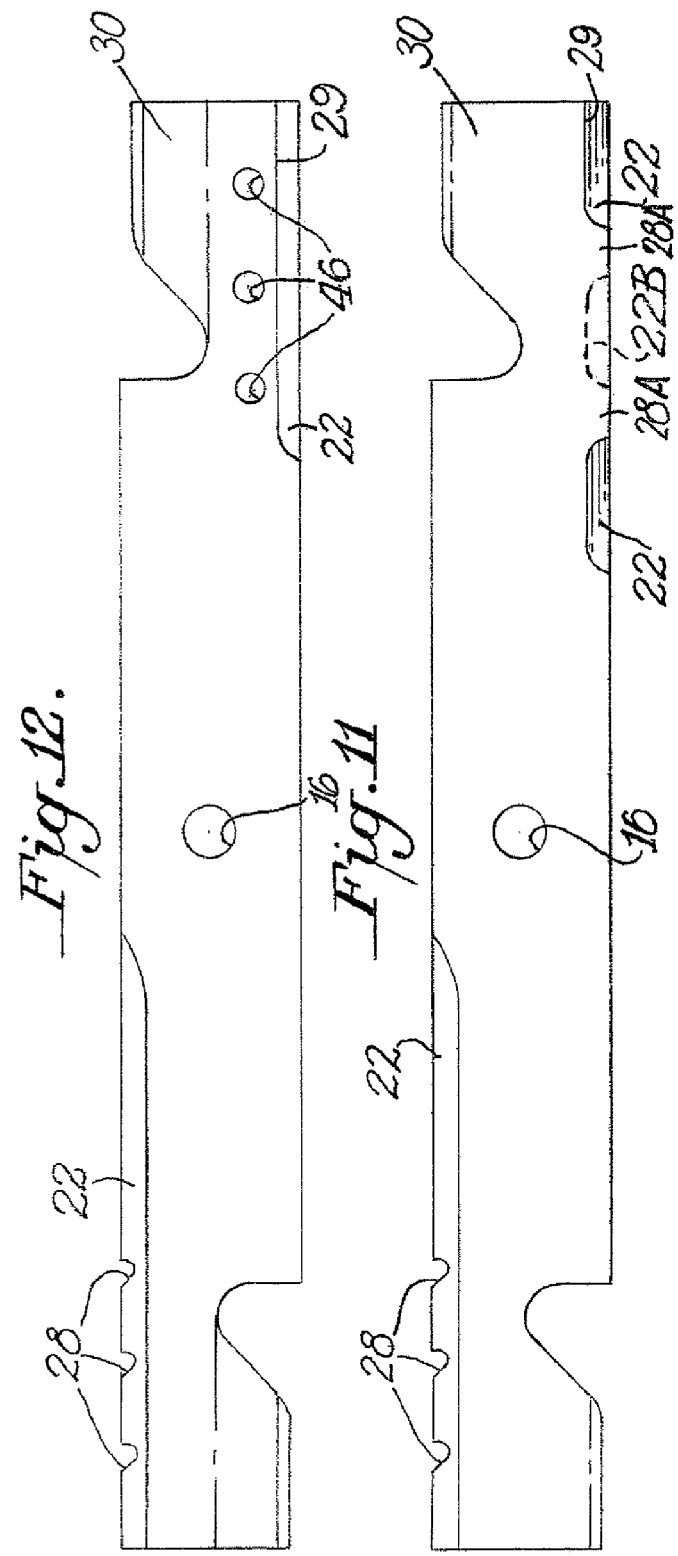

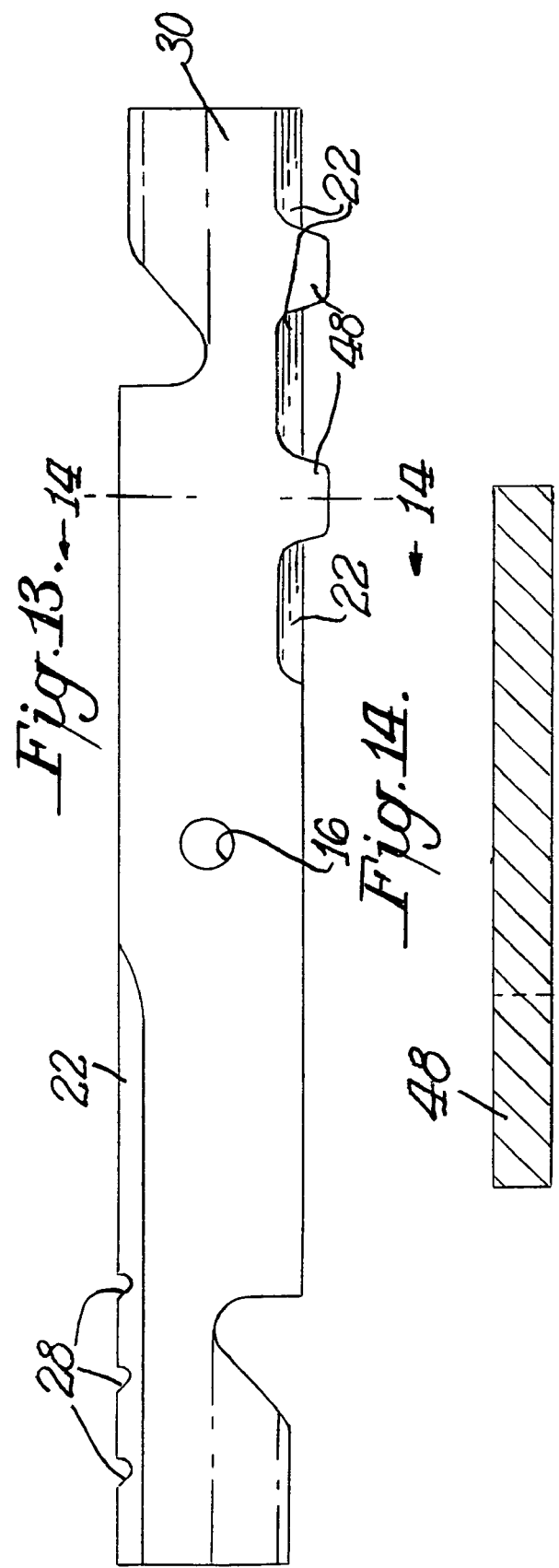

ROTARY MOWER BLADE

BACKGROUND OF THE INVENTION

There is a constant effort to improve the efficiency of blades used on lawnmowers and in particular on powered lawnmowers not only for cutting grass and the like, but also for mulching purposes. In my U.S. Pat. No. 5,581,987 I disclosed a mower blade which can be utilized with both cutting and mulching mowers.

In general, a rotary lawnmower includes a mower blade mounted below the deck which rotates about an axis. The free end of the blade comprises a cutting edge. Typically the cutting edge would be at an angle no greater than 30°. Attempts have been made to improve the efficiency of the cutting edge by forming notches or irregularities in the exposed portion of the cutting edge. These notches or irregularities are also at a small angle and sharpened so that the notches or irregularities are part of the cutting edge and likewise perform the cutting function. Examples of these techniques are described in U.S. Pat. Nos. 2,869,311, 3,022,621, 3,214,896, 3,452,524, 3,949,541, 3,998,037 and 5,899,053. U.S. Pat. No. 4,617,788 shows a variation wherein a mulching blade is provided with a pair of notches in the cutting edge. Each of the notches forms an opening which is substantially an equilateral triangle.

SUMMARY OF THE INVENTION

An object of this invention is to provide improvements in a mower blade.

A further object of this invention is to provide such a mower blade which can effectively cut and mulch.

In accordance with this invention the mower blade is in the form of an elongated body member which would be rotationally mounted below the deck of a power driven mower. The body member has at least one free end with a front leading edge and a rear trailing edge interconnected by a tip. At least a portion of the leading edge is tapered to create a sharpened cutting edge when the blade is rotated. In general, the invention is based upon providing at least one air flow deforming element on the blade to disturb air flow along the blade from the mounting structure to the tip and enhance the creation of vortices which allow the flow to go from the front leading edge to the rear trailing edge.

In a preferred practice of the invention the air flow deforming elements are a plurality of indentations formed in the front leading edge. Each indentation has a blunt (i.e. unsharpened) exposed surface at the front leading edge.

The invention may be broadly practiced where only one blunt indentation is formed in the cutting edge. A further variation of the invention would be to locate the blunt indentation in a portion of the edge which is not the sharpened cutting portion.

In other practices of the invention the air flow deforming elements could be ripples upwardly and/or downwardly formed in the blade at the edge or could be dimples upwardly and/or downwardly formed in the blade inwardly of the edge.

A BRIEF DESCRIPTION OF THE DRAWINGS

FIG. 1 is a side elevational view of a riding lawnmower incorporating a mower blade in accordance with this invention;

FIG. 2 is a cross-sectional view of a lawnmower deck incorporating the mower blade of FIG. 1 in accordance with this invention;

FIG. 3 is a side elevational view of a mower blade in accordance with this invention;

FIG. 4 is a top plan view of the mower blade shown in FIG. 3;

FIG. 5 is a right side elevational view of the mower blade shown in FIGS. 3-4;

FIG. 6 is a fragmental side elevational view of an alternative form of mower blade in accordance with this invention;

FIGS. 7-8 are perspective views of portions of alternative forms of mower blades in accordance with this invention;

FIG. 9 is a top plan view of yet a further form of mower blade in accordance with this invention;

FIG. 10 is a cross-sectional view taken through FIG. 9 along the line 10-10, with the background omitted for the sake of clarity;

FIGS. 11-13 are top plan views of still yet further alternative forms of mower blades in accordance with this invention; and FIG. 14 is a cross-sectional view taken through FIG. 13 along the line 14-14, with the background omitted for the sake of clarity.

DETAILED DESCRIPTION

The present invention relates to a mower blade that would be used with a power driven mower. Such power driven mower could be a riding mower such as mower 10 shown in FIG. 1 or could be a manually operated mower which would be pushed as is conventionally known.

In one practice of this invention the mower blade 12 would be mounted under the deck 14 of any suitable power driven mower, such as mower 10. As illustrated in, for example, FIGS. 3-4 blade 12 includes a central opening 16 so that a rotating shaft 18 of the mower 10 could be secured to blade 12 in any suitable known conventional manner to thereby rotate blade 12. Accordingly, opening 16 forms rotational mounting structure for mounting the blade 12 to the power driven mower and thereby facilitate the rotation of the blade.

Blade 12 is in the form of a body member 20 which is elongated in shape and has a free end extending outwardly longitudinally on each side of the rotational mounting structure 16. As best shown in FIG. 4 each free end has a front leading edge 22,22A and a rear trailing edge 24,24A. As shown in FIG. 4 if blade 12 were rotated in a clockwise direction edge 22 would be the leading edge which does the initial cutting and edge 24 would be its rear trailing edge. As blade 12 continues to rotate and has rotated 180° edges 22A and 24A would be in the illustrated position of edges 22 and 24. Stated differently, body member 20 includes a first edge which consists of a cutting edge such as edge 22 and a trailing edge 24A while body 20 also has a second edge consisting of cutting edge 22A and trailing edge 24. In the preferred practice of this invention elongated body member 20 is symmetrically formed in that the portion of body member 20 on each side of rotational mounting structure 16 is of opposite but identical structure to each other.

As best shown in FIGS. 4-5 the cutting edge 22 is tapered at a suitably small angle (typically and preferably no greater than 30°) to comprise a sharpened cutting edge which extends over preferably the major length on its side of rotational mounting structure 16.

In the illustrated embodiment of this invention the front leading cutting edge 22 is interconnected to its rear trailing edge 24 by a tip 26 which could take any suitable shape such as being generally perpendicular to each edge as shown or could be of rounded or any other shape. Since the cutting edge 22,22A has the main cutting function it is not necessary for the trailing edge 24,24A to be a sharpened edge. Although, such could be done within the practices of this invention.

The present invention is broadly based upon the provision of some modification of the blade structure by providing at least one air flow deforming element on the blade so as to disturb air flow along the blade from the mounting structure to the tip and thereby enhance the creation of vortices which allow the flow to go from the front leading edge to the rear trailing edge. Such air flow deforming elements can take various shapes (such as indented into the leading edge or projecting in front of the leading edge or being located in unsharpened portions of the leading edge 22) and can be at various locations which would have varying degrees of effectiveness while still, however, being within the broad teachings of this invention.

FIGS. 3-4 illustrate such a preferred practice of this invention wherein a plurality of blunt (i.e. unsharpened) indentations 28 is provided in each sharpened cutting edge 22,22A. These blunt indentations thereby interrupt the cutting edge to interrupt the air flow and thus disturb the air flow from the center pivot point or mounting structure 16 down to the tip 26. The creation of these vortices allow the flow to go from the front cutting edge 22,22A of the blade to the back lift area of the blade, as indicated by the arrows in FIG. 4. The improved air flow across the blade would improve the efficiency of almost all other types of rotary blades, particularly blades which are meant to be mulching blades. This allows the entrained debris to be cut and re-cut as it stays in the rotating path of the blade. In multi-blade mowers (most commonly two or three blades under one deck) the new air flow minimizes the interference of air flow at the blade interface. Too much air flow down the blade can cause a band of un-mowed grass at the blade interface.

As shown in FIGS. 3-5 and in particular in FIG. 5 the indentations 28 are defined by a wall which extends upwardly from the bottom surface of the body member 20 at an angle to the bottom surface. Such angle is substantially larger than the small angle of the cutting edge 22. As best shown in FIG. 5 the wall of the indentation is substantially perpendicular or 90° to the bottom surface of the body member.

The invention can be readily incorporated into otherwise conventional blade structure by simply forming such indentations 28 since it is not necessary that the indentations are sharp. Thus, by having blunt indentations the simplicity of incorporating these indentations is quite practical.

In use conventional blades tend to wear inwardly from the leading edge toward the trailing edge. As a result during maintenance the sharpened leading edge is usually resharpened along its entire length. With a blade 12 in accordance with this invention where the air flow is directed generally perpendicularly from the leading edge to the trailing edge, as shown by the arrows in FIG. 4, the resulting wear extends inwardly from the corner at the junction of the leading edge 22 and of tip 26 so that during wear the mower blade takes the shape at its corner indicated in phantom in FIG. 4 by the reference numeral 31. When it is periodically desired to resharpen the blade, in accordance with the practice of this invention portions of the blade edge 22 inwardly from the worn corner and closer toward the mounting hole 16 may still be fairly sharp. As a result the main resharpening could be concentrated at the worn corner 31 with the remainder of the sharpened edge 22 requiring little or no additional resharpening.

FIG. 4 illustrates each of the indentations 28 to be identical with each other and generally each indentation is in the shape of a swirl which has a shape (when viewed from the direction of the tip 26 to the mounting structure 16) of a shallow angle wall starting from the exposed edge of cutting edge 22 and extending inwardly toward the shoulder or ridge 29 of the tapered cutting edge where the wall then bends by a curved transition into a generally planar wall. Thus, each indentation 28 is of non-symmetrical shape. It is to be understood that the invention, however, may be practiced where the indentations take other shapes including being symmetrical. In addition, the indentations need not be uniform, well-defined or mirrored side to side of the blade. Different ends of the blade, for example, do not need to be mirror images of each other. Although FIG. 4 illustrates the indentations 28 to be confined outwardly of the shoulder or ridge 29, the invention may be practiced where the indentations extend further into the blade even beyond the sharpened bevel past shoulder 29.

A further feature of blade 12 is that the remote portion 30 of trailing edge 24 is bent outwardly away from the main surface of body member 20 as best shown in FIG. 5 and as also shown in FIGS. 3-4. A recessed edge 32 thereby results which extends outwardly from the general plane of body member 20. Preferably, this recessed edge 32 is tapered at a shallow angle and is sharpened to function as a sharpened cutting edge. This recessed edge 32 is located in a cutout 34 in trailing edge 24. The cutout 34 allows a bypass for the natural flow down the blade from the pivot point or mounting structure 16 to the end of the blade making the effect of the changed air flow even more effective. By making the inside of the lift area sharp it becomes a cutting edge 32 for the debris entrained in the bypass air in the natural air flow from the pivot point of mounting structure 16 down the blade toward the end of the blade.

FIG. 6 illustrates a further variation of the invention wherein the lift area 30 is provided with at least one and preferably a plurality of indentations 36 which are similar to notches or indentations 28 and thus are preferably blunt to further enhance the effectiveness of blade 12.

It is to be understood that the invention can be practiced with numerous variations without departing from the spirit of the invention. For example, the blunt areas on the edge of the blade are preferably in the sharpened areas 22,22A. The invention, however, could be practiced by locating such blunt indentations in other portions of the first (front) or second (rear) edges displaced from the sharpened cutting edge. Similarly, although FIG. 6 illustrates a pair of blunt indentations 36 in the lift area 30 of the blade 12, more than two indentations could be provided or only a single indentation. Further, instead of or in addition to the indentations to the lift area 30 one or more indentations could be provided in other portions of the trailing edge 24,24A.

FIG. 7 illustrates a further variation of this invention. As shown therein the body member has an upper surface 38 and a lower surface 40 and includes a cutting edge 22. In this embodiment of the invention the air flow deforming elements are ripples 42 which extend upwardly in the upper surface 38. Such ripples could be formed during manufacture to change the air flow and could be perpendicular or at a non-perpendicular angle to the cutting edge 22. The provision of such structure has the advantage that the blade may be sharpened in a normal manner without having to recut grooves or indentations into the leading edge. The exposed edge of each ripple 42 could also be a sharpened edge.

Although FIG. 7 illustrates the ripples formed upwardly from upper surface 38, the invention could also be practiced where the ripples extend downwardly from the lower surface 40. Alternatively, one or more ripples may extend upwardly while one or more extend downwardly. Although FIG. 7 illustrates the ripples 42 to be generally perpendicular to and extending outwardly from the upper surface 38 of the blades the invention could be practiced where the ripples are at a non-perpendicular angle and where the ripples are not identical with each other and where the ripples are of any suitable size and shape.

Although the air flow deforming elements are illustrated as ripples 42 which are integral with and formed during the manufacture of the blade body member, such air flow deforming elements could be separate elements secured to the upper and/or lower surfaces of the blade. Such separate elements could, for example, be wires welded to the body member. The wires could be straight, curved or of any other suitable shape and cross-section.

FIG. 8 shows yet another variation of the invention wherein the air flow deforming elements are dimples 44 extending outwardly from the upper surface 38 and/or lower surface 40 which likewise could be formed during manufacture. A difference between the dimples 44 of FIG. 6 and the ripples 42 of FIG. 7 is the location of these air flow deforming elements. For example, the ripples 42 extend completely to the cutting edge while extending outwardly from the plane of the main portion of at least one of the upper surface and/or the lower surface. The dimples 44, however, are located completely inwardly of and spaced from the exposed outer portion of the first edge, such as the cutting edge 22. Preferably, the dimples 44 are located inwardly of, but near the ridge 29 which defines the innermost portion of the sharpened section of the cutting edge 22. As a result, the dimples need not have a sharpened exposed surface.

Although the air flow deforming elements 42 are illustrated as uniformly shaped ripples in FIG. 7 and the air flow deforming elements 44 are illustrated as spherical portions, the ripples and dimples may take other shapes and could be separate members, such as wire segments, secured by welding or other fastening techniques to the upper and/or lower surfaces 38,40 of the blade body member.

FIGS. 9-14 illustrate other possible forms of air flow deforming elements. For purposes of illustration, the variations are shown in only one leading edge, while the other leading edge is illustrated as having the air flow deforming elements in the form of the previously described indentations. Such variations, however, could be in both leading edges and/or in one or both trailing edges.

While it is preferable to have a cutting edge 22 extend completely from the tip 26 almost to the mounting hole 16, the cutting tip 22 could be of much smaller length. The invention could be practiced where the cutting edge is, for example, of a length of less than 1A the length from the tip 26 to the mounting hole 16. Where there is a shorter sharpened edge 22 it may be desirable to provide the air flow deforming elements in the adjacent blunt portion 28A (between the sharpened edge portions 22) of the leading edge rather than in the cutting or sharpened edge.

FIGS. 9-10 show a practice of the invention wherein the leading edge is formed with a plurality of spaced cutting edge portions 22 having an unsharpened or blunt portion 28 adjacent to each sharpened edge 22. The blunt portions 28 function as air flow deforming elements.

FIG. 11 shows yet a further practice of the invention which is similar to that of FIG. 9 except that the sharpened edge portions are in both the upper and lower surfaces of the blade with the lower surface sharpened edge 22B being shown in phantom and the upper surface sharpened edges 22 being shown in solid lines. Blunt portions 28A are adjacent the sharpened edge portions 22, 22B.

FIG. 12 shows yet another variation where the air flow deforming elements comprise one or more holes 46 extending completely through the blade. The holes 46 may be located at any suitable location in the elongated body member of the blade. Preferably the holes are located nearer to the leading cutting edge than to the unsharpened trailing edge, such as near shoulder 29, and preferably such holes would also be located on each side of the mounting opening 16.

FIGS. 13-14 show yet another variation wherein the air flow deforming elements comprise one or more projections 48 extending forwardly of the leading edge. Such projections are preferably in the blunt or unsharpened portion of the leading edge between sharpened edge portions 22, but could instead and/or also be in the sharpened edge 22, particularly where edge 22 is a single sharpened portion rather than the illustrated spaced sharpened edge portions. Where the projections are in the sharpened edge 22 such projections are preferably sharpened. A variation of the projections 48 illustrated in FIGS. 13-14, would be to have the projections extend not only forwardly of the leading edge, but also upwardly and/or downwardly from the upper and/or lower surfaces of the blade.

While the invention is preferably practiced with the air flow deforming elements at or near the leading edge of the blade in or near the sharpened cutting edge, it is to be understood that such air flow deforming elements may be located in the unsharpened trailing edge in addition to or instead of being in the leading edge.

In general the air flow deforming elements broadly could comprise any structure added to the blade or incorporated in the blade to change the air flow. Such structure could, for example, be a radiused edge or could be something mechanically mushroomed into the leading edge or projecting outwardly from the leading edge. Essentially, the elements would comprise some structure that extends upwardly from and/or downwardly from and/or outwardly from as well as through the blade if it functions to change the air flow in the intended manner.

The air flow deforming elements could also be formed by bending upwardly or downwardly a portion of the blade edge. For example, a portion of the edge about ½ inch long could be bent away from the normal plane of the blade body member. Such bending could take place at any suitable location along the blade edge. The bending could be done by forming slits which facilitate the blade material to be bent upwardly or downwardly or could be done by simply distorting the blade material in an upward or downward direction. One or more of such bent portions could be formed along the blade edge to function as the air flow deforming elements either alone or in combination with other forms of elements. The bent portions could be formed in the unsharpened and/or sharpened portions of the blade edge including at the outward corner of the blade. Such bent portions could, of course, also be formed in either the leading edge or trailing edge.

The invention may also be practiced where different types of air flow deforming elements are incorporated in a single blade in combination with each other, such as shown in FIGS. 9-14. Thus, for example, a single blade may include such air flow deforming elements as indentations and/or ripples and/or dimples and/or holes. Accordingly, it is to be understood that various features described with respect to any one embodiment of the invention may be incorporated in other embodiments where suitable and desired.

It is also to be understood that a blade using the features of blade 12 could be incorporated in various types of mowers, such as single blade or multi-blade mowers. In addition, different mounting techniques could be used to allow one blade of a specific length to be mounted to a number of different rotary lawn mowers. This may be done by providing slots to accommodate alignment pins or different hole diameters with bushings or washers to allow mounting to different bolt configurations or diameters. The end detail on blades of differing lengths could remain the same while the mounting details and the length of the blade could be changed to accommodate differing mower deck requirements. In this way blades could be offered to use on many different mowers.

A mower using a blade 12 in accordance with this invention could effectively operate on lawns having leaves, twigs, small branches, pine cones, sweet gum balls, etc. A distinct benefit from use of blade 12 could be to eliminate the classic wind-row to one side of the mower. Such wind-row is a line of grass or debris deposited to the right or left side of the deck and not buried in the turf or scattered uniformly over the turf.

The invention claimed is:

1. A rotary mower blade for a power driven mower comprising an elongated body member, said body member having rotational mounting structure for mounting said blade to a power driven mower to thereby rotate said blade about an axis of rotation, said body member having at least one free end outwardly of said mounting structure, said free end having a first edge and a second edge interconnected by a tip, at least a portion of said first edge being tapered upwardly and inwardly at a small angle away from a bottom surface of said body member to create a sharpened cutting edge, said cutting edge of said first edge being a front leading edge, said front leading edge having an exposed outer portion, at least a portion of said second edge being a rear trailing edge, a plurality of air flow deforming elements in said free end, each of said elements being structured to disturb air flow along said blade from said mounting structure to said tip when said blade is rotating to enhance the creation of vortices which allow the flow to go from said first edge to said second edge, said plurality of elements comprising indentations in said front leading edge extending inwardly from said exposed outer portion of said front leading edge, each of said indentations being defined by a wall which extends upwardly from said bottom surface of said body member at an angle to said bottom surface, and said angle of said wall being a substantially larger angle than said small angle of said cutting edge to form an unsharpened blunt exposed surface for deforming air flow.

2. The blade of claim 1 wherein a cutout is formed in said trailing edge inwardly of said tip, the portion of said body member between said cutout and said tip being disposed outwardly from an adjacent portion of said body member to form a lift area, said lift area having an exposed edge inwardly of said tip at said cutout, said exposed edge being sharpened to comprise a cutting edge, said indentations at said front leading edge being blunt, and said cutout forming a bypass for the natural flow down said blade from said mounting structure to said tip.

3. The blade of claim 2 wherein there is at least one indentation in said rear trailing edge extending inwardly thereof.

4. The blade of claim 1 wherein each of said indentations is non-symmetrical in shape.

5. The blade of claim 1 wherein each of said indentations is identical with each other.

6. The blade of claim 1 wherein said body member includes a further free end extending outwardly of said mounting structure in a direction diametrically opposite said at least one free end, said second free end having a front leading edge which merges into said rear leading edge of said one free end and said second free end having a rear trailing edge which merges into said front leading edge of said one free end.

7. The blade of claim 6 wherein said second free end includes a plurality of indentations in its front leading edge extending inwardly from the exposed outer surface of its front leading edge, and each of said indentations in said second free end having an exposed edge which is more blunt than said cutting edge of said front leading edge of said second free end.

8. The blade of claim 7 wherein each of said free ends is the mirror image of each other.

9. The blade of claim 1 wherein at least one of said indentations is located in said sharpened cutting edge.

10. The blade of claim 1 wherein a cutout is formed in said trailing edge inwardly of said tip, the portion of said body member between said cutout and said tip being disposed outwardly from an adjacent portion of said body member to form a lift area, said lift area having an exposed edge inwardly of said tip at said cutout, said lift area exposed edge being sharpened to comprise a cutting edge, and said cutout forming a bypass for the natural flow down said blade from said mounting structure to said tip.

11. The blade of claim 1 in combination with a power driven mulching mower having rotating structure, and said mounting structure being mounted to said rotation structure.

12. The blade of claim 1 wherein said small angle is no greater than 30°.

13. The blade of claim 12 wherein said angle of said wall is about 90°.

14. The blade of claim 1 wherein said angle of said wall is about 90°.

15. A rotary mower blade for a power driven mower comprising an elongated body member, said body member having rotational mounting structure for mounting said blade to a power driven mower to thereby rotate said blade about an axis of rotation, said body member having at least one free end outwardly of said mounting structure, said free end having a front leading edge and a rear trailing edge interconnected by a tip, at least a portion of said front leading edge being tapered upwardly and inwardly at a small angle away from a bottom surface of said body member to create a sharpened cutting edge, said front leading edge having an exposed outer portion, at least one non-symmetrically shaped indentation in said front leading edge extending inwardly from said exposed outer portion of said front leading edge, and said indentation being defined by a wall which extends upwardly from said bottom surface of said body member at an angle to said bottom surface, and said angle of said wall being a substantially larger angle than said small angle of said cutting edge to form an exposed unsharpened blunt edge to disturb air flow along said blade from said mounting structure to said tip when said blade is rotating to enhance the creation of vortices which allow the flow to go from said front leading edge to said rear trailing edge.

16. The blade of claim 15 wherein a cutout is formed in said trailing edge inwardly of said tip, the portion of said body member between said cutout and said tip being disposed outwardly from an adjacent portion of said body member to form a lift area, said lift area having an exposed edge inwardly of said tip at said cutout, said lift area exposed edge being sharpened to comprise a cutting edge, and said cutout forming a bypass for the natural flow down said blade from said mounting structure to said tip.

17. The blade of claim 16 wherein there is at least one indentation in said rear trailing edge extending inwardly thereof.

18. The blade of claim 15 wherein said small angle is no greater than 30°, and said angle of said wall is about 90°.

19. The blade of claim 14 wherein said angle of said wall is about 90°.

20. The blade of claim 15 wherein said angle of said wall is about 90°.

* * * * *